United States Patent
Abe (10) Patent No.: US 6,669,494 B2
(45) Date of Patent: Dec. 30, 2003

(54) CARD CONNECTOR HAVING IMPROVED STOPPER FOR EJECT MECHANISM

(75) Inventor: Kiyoshi Abe, Tokyo (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 0 days.

(21) Appl. No.: 10/102,928

(22) Filed: Mar. 22, 2002

(65) Prior Publication Data

US 2002/0142640 A1 Oct. 3, 2002

(30) Foreign Application Priority Data

Mar. 23, 2001 (JP) .................................. 2001-085757

(51) Int. Cl.[7] .............................................. H01R 13/20
(52) U.S. Cl. ...................................................... 439/159
(58) Field of Search ................................ 439/157, 159, 439/155, 160

(56) References Cited

U.S. PATENT DOCUMENTS

| | | | |
|---|---|---|---|
| 4,810,200 A | 3/1989 | Sakamoto | 439/155 |
| 4,952,161 A | 8/1990 | Komatsu | 439/155 |
| 5,033,972 A | 7/1991 | Komatsu et al. | 439/153 |

(List continued on next page.)

FOREIGN PATENT DOCUMENTS

| | | |
|---|---|---|
| JP | 11-316110 | 11/1999 |
| JP | 2000-251024 | 9/2000 |
| JP | 2000-251025 | 9/2000 |
| JP | 2000-277207 | 10/2000 |

OTHER PUBLICATIONS

U.S. patent application Ser. No. 09/832,190, Takada et al., filed Apr. 11, 2001.
U.S. patent application Ser. No. 09/914,322, Sato, filed Aug. 27, 2001.
U.S. patent application Ser. No. 09/978,660, Sato, filed Oct. 18, 2001.
U.S. patent application Ser. No. 09/878,661, Sato, filed Oct. 18, 2001.
U.S. patent application Ser. No. 10/067,404, Ooya et al., filed Feb. 7, 2002.
U.S. patent application Ser. No. 10/090,153, Ito et al., filed Mar. 5, 2002.
U.S. patent application Ser. No. 10/102,826, Sato et al., filed Mar. 22, 2002.

Primary Examiner—Tulsidas Patel
(74) Attorney, Agent, or Firm—Finnegan, Henderson, Farabow, Garrett & Dunner LLP (57) ABSTRACT

The present invention provides a card connector whose molded base plate is not deformed during reflow soldering, thus allowing reductions in size, height and weight of the card connector. The card connector of the invention has a shell body and a molded base plate. The molded base plate includes at least a card eject mechanism having a compression coil spring and adapted to insert and eject a card and a stopper for holding the card eject mechanism pushed by the compression coil spring. The shell body includes at least one bent piece for fixing and supporting the stopper in three-dimensional directions.

18 Claims, 7 Drawing Sheets

U.S. PATENT DOCUMENTS

| | | | |
|---|---|---|---|
| 5,051,101 A | 9/1991 | Komatsu | 439/159 |
| 5,145,389 A | 9/1992 | Okubo | 439/159 |
| 5,179,505 A | 1/1993 | Matsuo | 361/395 |
| 5,197,894 A | 3/1993 | Koike | 439/159 |
| 5,286,207 A | 2/1994 | McHugh | 439/64 |
| 5,492,480 A | 2/1996 | Fusselman et al. | 439/157 |
| 5,492,481 A | 2/1996 | Lewis | 439/159 |
| 5,533,906 A | 7/1996 | Abe | 439/159 |
| 5,597,316 A | 1/1997 | David et al. | 439/159 |
| 5,640,307 A | 6/1997 | Bleier et al. | 361/740 |
| 5,648,651 A | 7/1997 | Inoue | 235/475 |
| 5,655,918 A | 8/1997 | Soh | 439/159 |
| 5,674,080 A | 10/1997 | Takemura | 439/159 |
| 5,695,351 A | 12/1997 | Kimura et al. | 439/159 |
| 5,703,346 A | 12/1997 | Bricaud et al. | 235/44.1 |
| 5,725,385 A | 3/1998 | Takano et al. | 439/64 |
| 5,740,012 A | 4/1998 | Choi | 361/686 |
| 5,871,365 A | 2/1999 | Kajiura | 439/159 |
| 5,890,920 A | 4/1999 | David et al. | 439/159 |
| 5,899,763 A | 5/1999 | Kajiura | 439/159 |
| 5,923,541 A | 7/1999 | Yasumi | 361/768 |
| 5,967,810 A | 10/1999 | Spickler et al. | 439/159 |
| 6,065,984 A | 5/2000 | Tung | 439/159 |
| 6,083,018 A | 7/2000 | Hara et al. | 439/159 |
| 6,095,834 A | 8/2000 | Lai et al. | 439/159 |
| 6,106,313 A | 8/2000 | Chen | 439/159 |
| 6,120,309 A | 9/2000 | Hara | 439/159 |
| 6,139,340 A | 10/2000 | Niitsu | 439/159 |
| 6,152,748 A | 11/2000 | Sato et al. | 439/159 |
| 6,159,027 A | 12/2000 | Kuo | 439/159 |
| 6,162,075 A | 12/2000 | Hara et al. | 439/159 |
| 6,174,197 B1 | 1/2001 | Hirata et al. | 439/541.5 |
| 6,200,148 B1 | 3/2001 | Yu | 439/159 |
| 6,210,187 B1 | 4/2001 | Tung | 439/159 |
| 6,227,879 B1 | 5/2001 | Dong | 439/92 |
| 6,231,360 B1 | 5/2001 | Horie | 439/159 |
| 6,234,813 B1 | 5/2001 | Hanyu | 439/159 |
| 6,270,365 B1 | 8/2001 | Nishioka | 439/159 |
| 6,273,737 B1 | 8/2001 | Furusho et al. | 439/159 |
| 6,290,136 B1 | 9/2001 | Koseki et al. | 235/475 |
| 6,299,465 B1 | 10/2001 | Hirata | 439/159 |
| 6,302,715 B1 | 10/2001 | Sato et al. | 439/159 |
| 6,319,029 B2 | 11/2001 | Nishioka | 439/159 |
| 6,332,790 B1 | 12/2001 | Ishikawa et al. | 439/157 |
| 6,390,836 B1 | 5/2002 | Motegi et al. | 439/159 |
| 6,394,827 B2 | 5/2002 | Nogami | 439/159 |
| 6,398,567 B1 | 6/2002 | Nishimura | 439/159 |
| 6,398,827 B1 | 6/2002 | Ota et al. | 51/318 |

CARD CONNECTOR HAVING IMPROVED STOPPER FOR EJECT MECHANISM

This application is based on Japanese Patent Application No. 2001-085757 filed Mar. 23, 2001, the content of which is incorporated hereinto by reference.

BACKGROUND OF THE INVENTION

Field of the Invention

The present invention relates to a card connector mounted on electronic devices, such as cellular phones, telephones, PDAs (personal digital assistants), portable audio devices and cameras, and more specifically to a card connector which prevents deformation of its resin base plate when the card connector is soldered to printed circuit boards of the electronic devices.

DESCRIPTION OF THE RELATED ART

In electronic devices such as cellular phones, telephones, PDAs and cameras, a variety of functions are added by inserting an IC card with a built-in CPU or memory IC, such as a SIM (subscriber identity module) card, an MMC (multimedia card), an SD (secure digital) card, a Memory Stick (tradename) and a Smart Media (tradename).

Many of the card connectors mounted on such electronic devices have an eject mechanism for removing an inserted card from the connector.

Figure 6A:
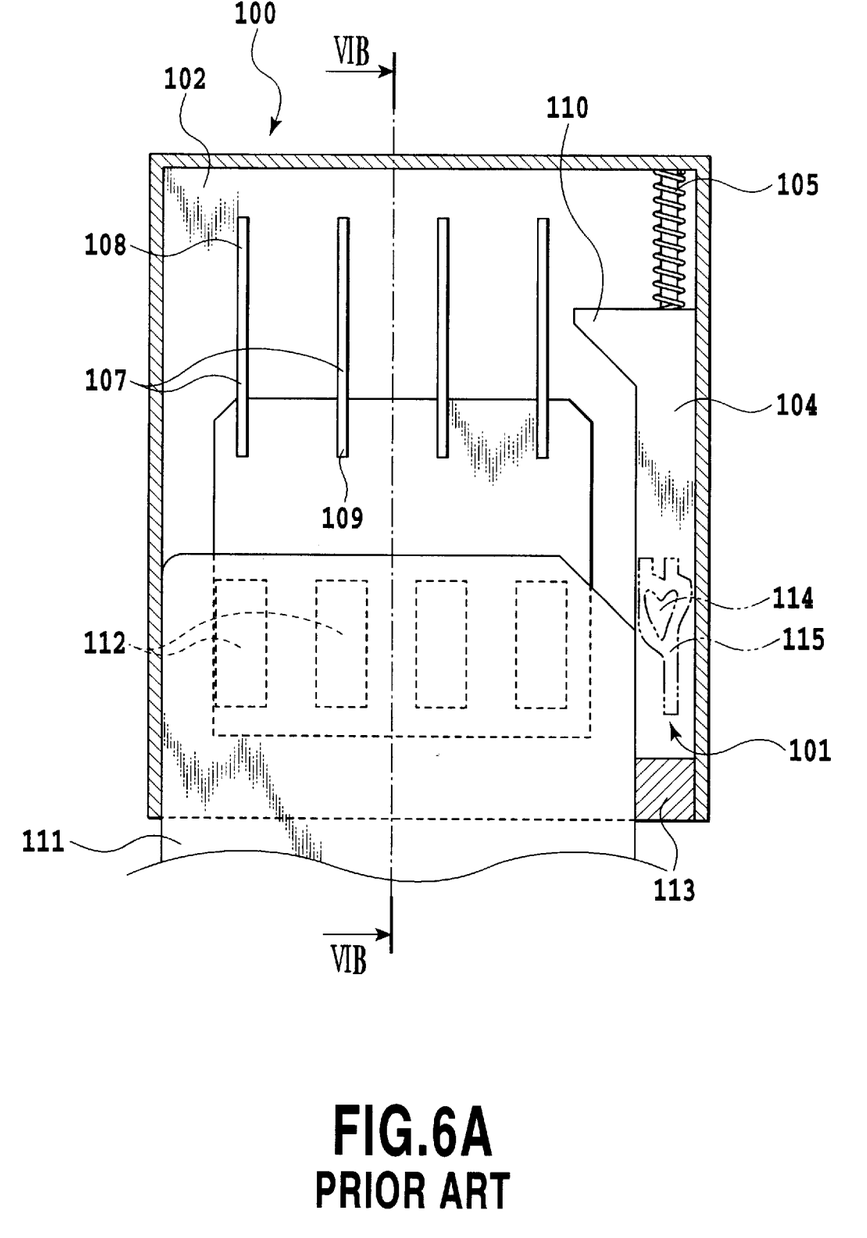
FIGS. 6A and 6B are schematic views of a conventional card connector, FIG. 6A representing a horizontal cross-sectional view and FIG. 6B representing a cross-sectional view taken along the line VIB—VIB of FIG. 6A.
Figure 6B:
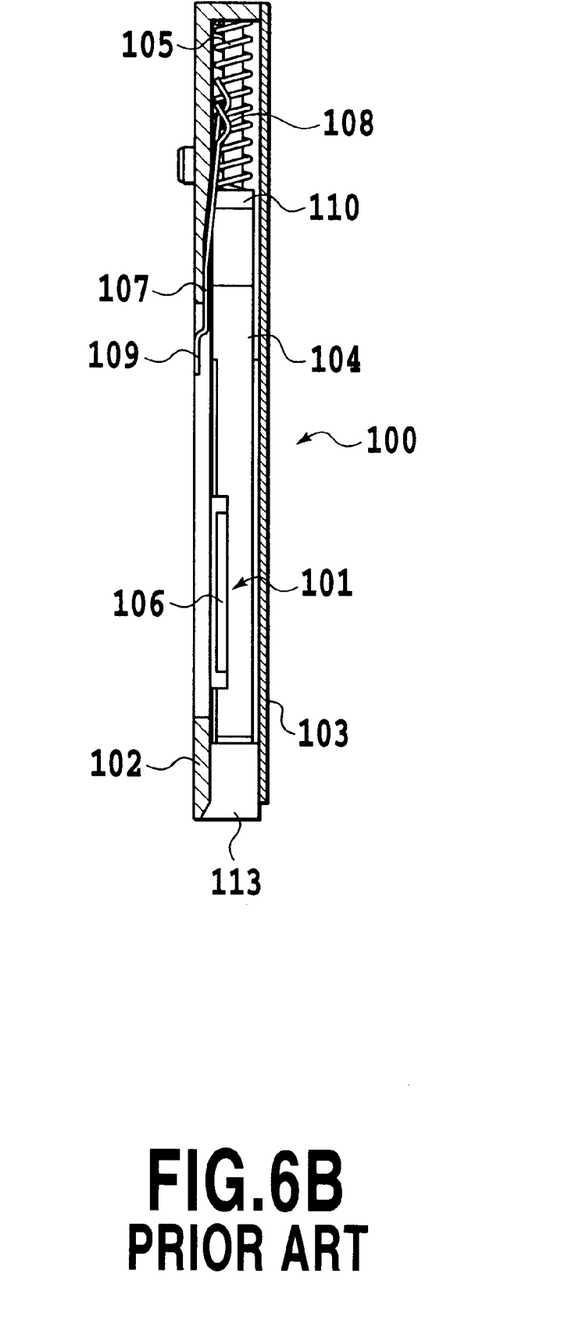

A conventional card connector will be explained by referring to FIGS. 6A and 6B. FIG. 6A is a schematic plan view of the card connector with its cover removed. FIG. 6B is a cross section taken along the line A—A of FIG. 6A.

The card connector 100 comprises a base plate 102 and a cover 103. At least the base plate 102 is formed from an insulating material of synthetic resin. The base plate 102 is provided with a plurality of contact terminals 107 to be brought into electrical contact with a plurality of electrode pads 112 arranged on a back surface of an IC card 111. The contact terminals 107 each have an elastic portion 108 for contact with the associated electrode pad 112 of the IC card 111 and a terminal portion 109 soldered to an associated contact pad of the printed circuit board of the electronic device.

En The card connector 100 has a push-push type card eject mechanism 101 along one side of the base plate 102. The card eject mechanism 101 includes an eject member 104 having a card engagement portion 110, a compression coil spring 105 for pushing the eject member 104 against a stopper 113 provided on the base plate 102 when the IC card 111 is not loaded, a heart cam 114 formed on the base plate 102, lever guide grooves 115 formed along and on both sides of the heart cam 114 to guide one end of a cam lever 106, and the cam lever 106 having its one end slide along the lever guide groove 115 and the other end rotatably mounted to the eject member 104.

In this card eject mechanism 101, when the IC card 111 is inserted into the card connector 100, the eject member 104 is pushed by the IC card 111 through the card engagement portion 110 toward a rear side of the card connector 100 against the force of the compression coil spring 105. At this time, one end of the cam lever 106 slides in one of the lever guide grooves 115 along the heart cam 114 and becomes locked by a recessed locking portion of the heart cam 114. As a result, the IC card 111 is held immovable in the card connector 100, with the electrode pads 112 of the IC card in contact with the contact terminals 107 of the card connector 100, thus electrically connecting the IC card 111 to the card connector 100.

When the card is to be ejected, a user slightly pushes the inserted IC card 111 toward the rear. This unlocks the cam lever 106 from the locking portion of the heart cam 114, with the result that the compression coil spring 105 forces the free end portion of the cam lever 106 to move through the other lever guide groove 115 along the heart cam 114 toward the front of the card connector. Thus the eject member 104 moves toward the front of the card connector 100, pushing the IC card 111 toward the front with the card engagement portion 110 and ejecting it from the card connector 100. (For details of the card eject mechanism, refer to Japanese Patent Unexamined Publication Nos. 2000-251024 and 2000-251025.)

In the card connector 100 of the construction described above, the terminal portions 109 of the contact terminals 107 are soldered to the contact pads of the printed circuit board of an electronic device. In recent years, this solder connection is realized by a reflow soldering because of the ease with which it can be processed.

The reflow soldering is done at an elevated temperature to melt the solder. Conventional card connectors are allowed a sufficient thickness so that the base plate, though made from resin, has adequate strength to withstand high-temperature processing. In recent years, however, there are growing demands for reduced size, thickness and weight of the card connectors. And the construction of the base plate forming the card connector is being stretched to its limit in terms of shape and size.

Under these circumstances, in a construction of the card connector in which the card eject mechanism pushed by the compression coil spring is held by the stopper on the resin base plate, as in the conventional card connectors, since the card connector is subjected to high temperatures when the reflow soldering is performed, the resin stopper is easily deformed by the force of the compression coil spring and may even get dislocated, giving rise to a possibility of an eject mechanism failure.

SUMMARY OF THE INVENTION

An object of the present invention is to solve the above-described problem and provide a card connector which prevents a mold (a resin base plate including the stopper) from being deformed during the reflow soldering and which can be reduced in size, height and weight.

To achieve the above objective, the card connector comprises a shell body and a molded base plate, wherein the molded base plate includes at least a card eject mechanism having a compression coil spring and adapted to insert and eject a card and a stopper holding the card eject mechanism pushed by the compression coil spring and wherein the shell body includes at least a bent piece for securing and holding the stopper in three-dimensional directions.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Embodiments of the present invention will be described in detail by referring to the accompanying drawings. The card connector of this invention is basically the same in structure as the conventional example described above.

Figure 1:
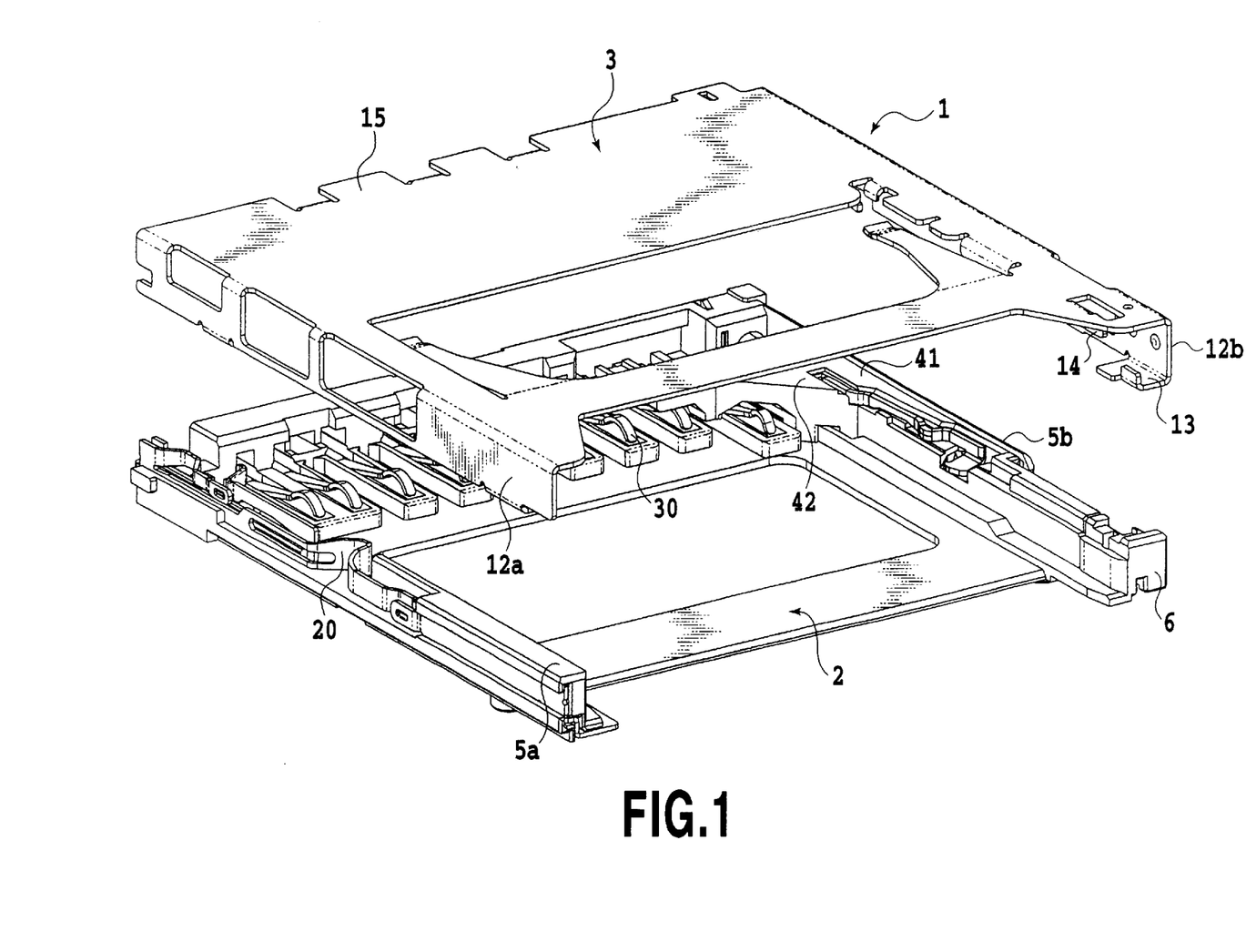
FIG. 1 is an exploded perspective view showing an entire card connector according to the present invention.
Figure 2:
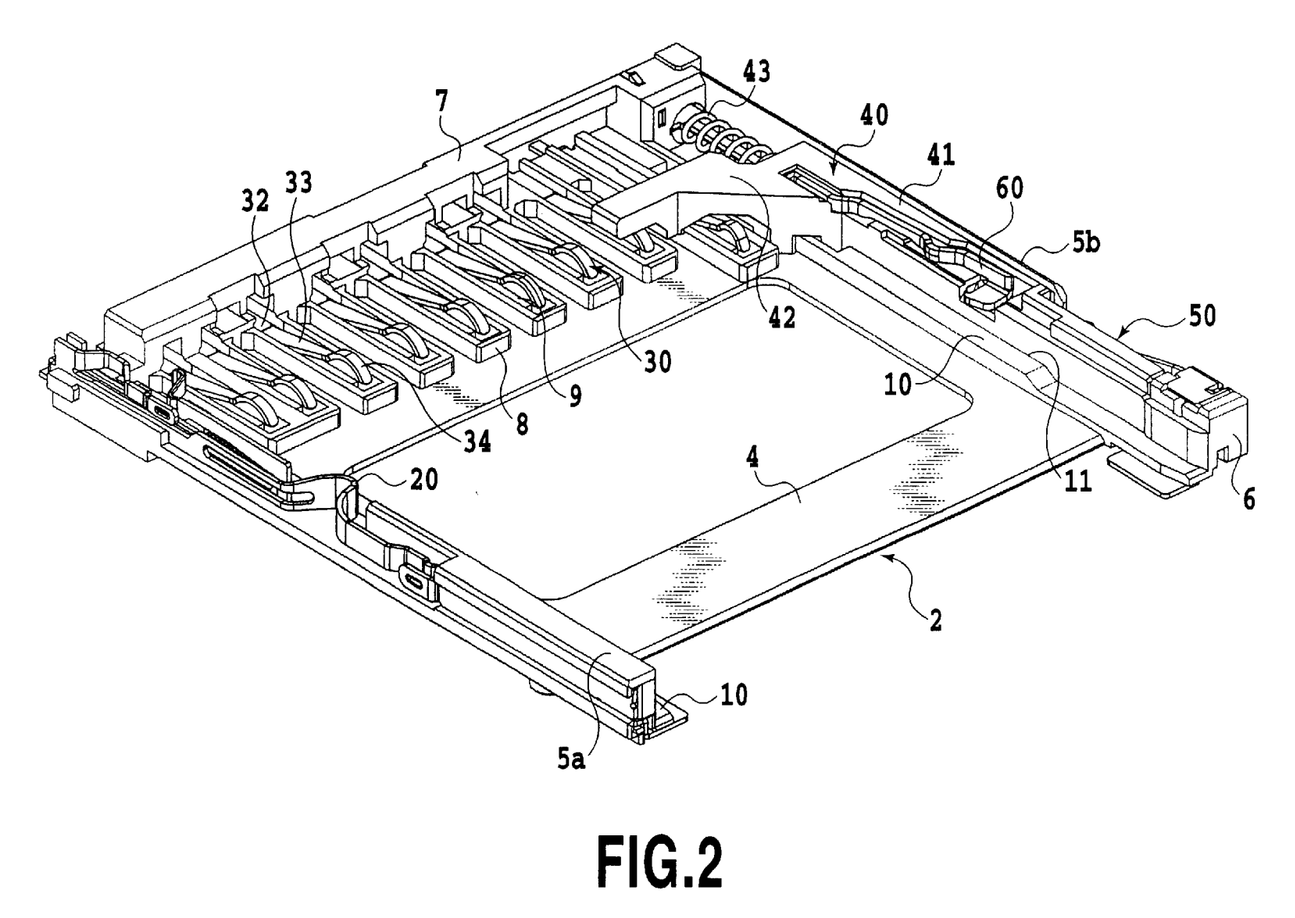
FIG. 2 is a perspective view showing an inner structure of the molded base plate of the card connector according to this invention.

FIG. 1 is an exploded perspective view of the card connector 1. FIG. 2 is a perspective view showing the inner structure of a lower housing (molded base plate) 2 with an upper housing (shell body) 3 removed.

The card connector 1 is mounted on electronic devices such as cell phones, PDAs, portable audio devices and cameras, and an IC card is inserted into the card connector 1 with its contact pad side down. The card connector 1 comprises a molded base plate (a lower housing) 2 and a shell body (an upper housing) 3. The molded base plate 2 is made from an insulating material such as resin and the shell body 3 from a processed sheet metal. The shell body 3 serves as a cover of the molded base plate 2 and also as a reinforcement for the card connector 1 as a whole.

The shell body 3 includes a top plate 15, left and right side plates 12a, 12b, and bent pieces 12, 13 for securing and holding a stopper 6 of the molded base plate 2 to be described later.

The molded base plate 2, as shown in FIG. 2, includes a bottom plate 4, left and right side plates 5a, 5b, the stopper 6, a rear wall 7, contact terminal mounts 8, contact terminal fixing grooves 9, IC card guide rails 10, and a guide groove 11 in which an eject member 41 to be described later slides.

The stopper 6 is provided at the front part (with respect to the IC card insertion direction) of the molded base plate 2 along one side plate 5b (right-hand side plate in the figure) to stop the eject member 41 that is urged toward the stopper 6 by the compression coil spring 43. Contact terminals 30 for electrically connecting the IC card and the electronic device are fixed in the respective contact terminal fixing grooves 9 formed in the contact terminal mounts 8. Further, the guide groove 11 is formed between one of the side plates 5b and the guide rail 10. On the other side plate 5a (the left-hand side plate) of the molded base plate 2 a plurality of metal leaf springs 20 which construct write protect switch for detecting the position of write protect button on the IC card are provided.

The contact terminals 30 are formed as cantilevered metal leaf springs each of which has a fixed portion 32 securely held in the contact terminal fixing groove 9 and an elastically deflecting spring portion 33. The spring portion 33 has at its free end an upwardly protruding arc contact portion 34 that engages an associated contact pad of the IC card. A terminal portion (not shown) soldered to an associated contact pad of the printed circuit board of an electronic device is extended from the fixed portion 32 of the contact terminal 30 on a side opposite the contact portion 34 through the rear wall 7.

A card eject mechanism 40 that inserts/ejects an IC card with a push-push action on the part of the user is arranged on the side of the one side plate 5b. The card eject mechanism 40 has a card engagement portion 42 extending into an IC card insertion space. The card eject mechanism 40 has an eject member 41 having a heart cam 50 formed in its side facing the one side plate 5b, a compression coil spring 43 urging the eject member 41 toward the stopper 6, an elastic locking piece 60 for preventing the IC card from coming off when the IC card is inserted, and a U-shaped cam lever (not shown) having one of its ends rotatably supported on the stopper 6 and the other end moving along the heart cam 50.

The heart cam 50 may be formed on the molded base plate 2, as in the conventional example described above. In that case, one end of the cam lever is supported by the eject member 41. Further, the card eject mechanism 40 may be provided on the side of the other side plate 5a opposite where it is provided in this embodiment.

The insertion/ejection of an IC card by the card eject mechanism 40 is similar to the conventional example and will be explained briefly.

When an IC card is inserted into the card connector 1, the eject member 41 is pushed by the IC card through the card engagement portion 42 toward the rear side of the connector against the force of the compression coil spring 43. At this time, one end of the cam lever slides along one side surface of the heart cam 50 and is then locked by the recessed locking portion of the heart cam 50. Now, the IC card is held immovable in the card connector 1, with the contact pads of the IC card in contact with the contact terminals 30 of the card connector 1.

When the IC card is to be ejected from the connector, the user pushes the inserted IC card slightly rearward. This unlocks the cam lever from the locking portion of the heart cam 50, allowing the eject member 41 to be moved forward by the force of the compression coil spring 43 until it is stopped by the stopper 6. As the eject member 41 is moved by the spring, the one end of the cam lever slides along the other side surface of the heart cam. As a result, the IC card is pushed and ejected out of the card connector 1 by the card engagement portion 42 of the eject member 41.

(First Embodiment)

Figure 3:
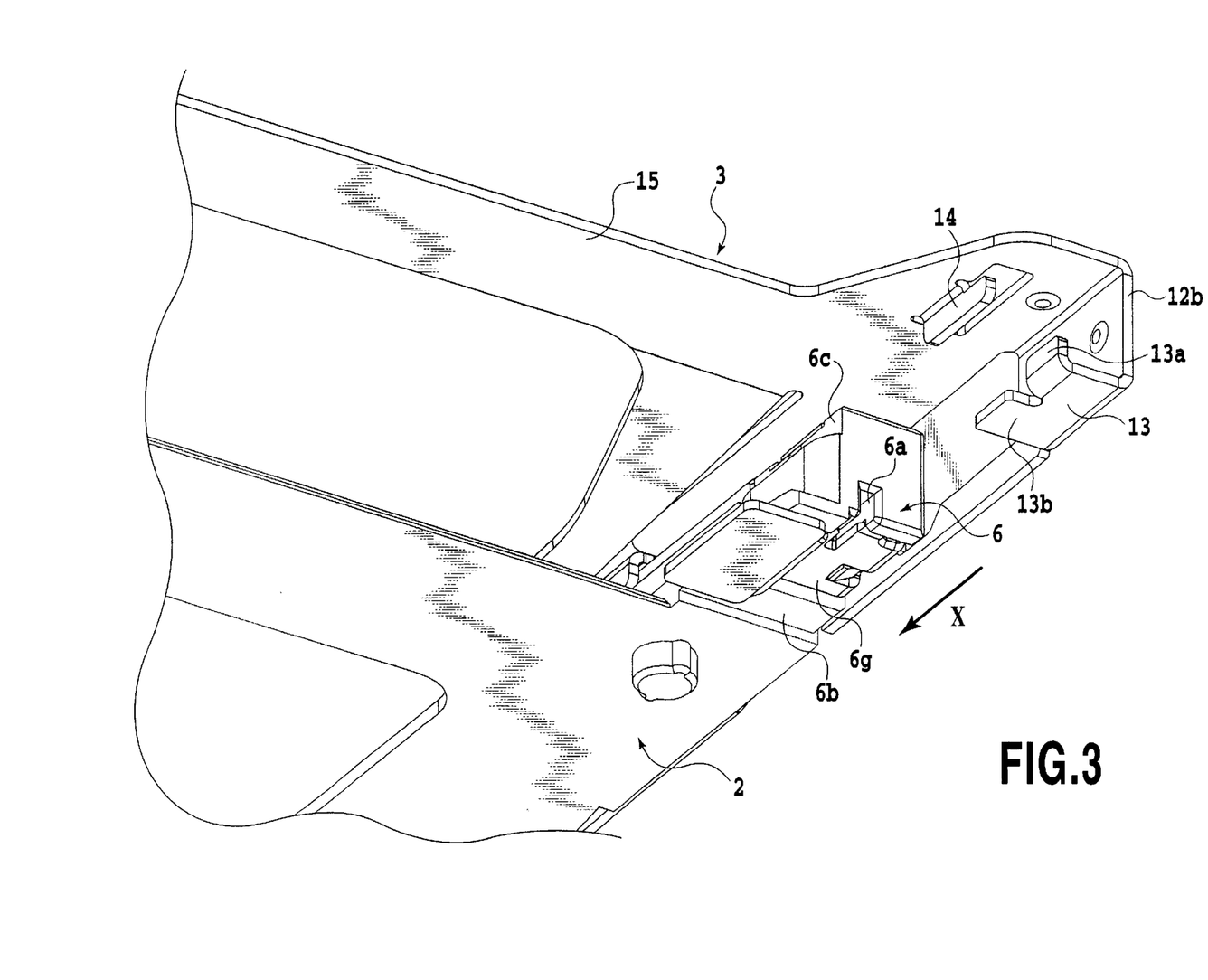
FIG. 3 is an essential-part enlarged view of a first embodiment of the card connector according to this invention, showing the molded base plate and the shell body before being assembled.
Figure 4:
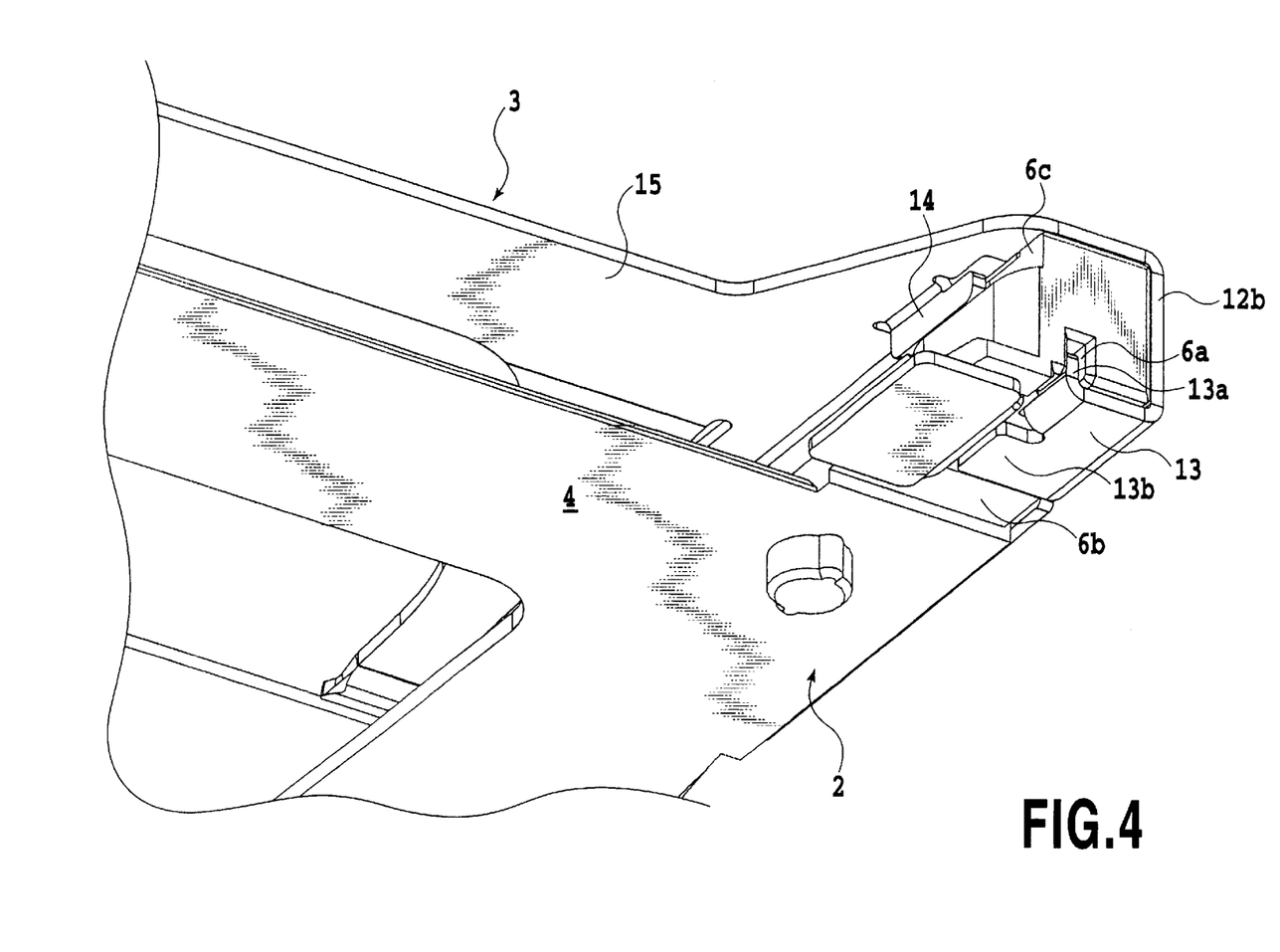
FIG. 4 is an essential-part enlarged view of the first embodiment, showing the molded base plate and the shell body after being assembled.

With reference to FIGS. 3 and 4, a first embodiment of the card connector according to this invention will be explained.

FIGS. 3 and 4 are essential-part enlarged views of the first embodiment of the invention. FIG. 3 shows the molded base plate 2 and the shell body 3 immediately before being assembled. FIG. 4 shows the molded base plate 2 and the shell body 3 immediately after being assembled by moving the shell body 3 in the direction of arrow X in FIG. 3.

As shown in FIG. 3, the shell body 3 has an upper bent piece 14 and a bottom bent piece 13 formed at its front right side portion to embrace and hold the stopper 6 of the molded base plate 2.

The upper bent piece 14, as shown in FIGS. 3 and 4, is formed by blanking the top plate 15 of the shell body 3 in such a manner that a part of the blanked portion is connected to the top plate 15, and by bending it substantially at right angles to the top plate 15. The upper bent piece 14 engages a side surface 6c of the stopper 6 (see FIG. 4) to prevent the stopper 6 from being deformed sideways (toward the IC card insertion space). The side surface 6c may simply be formed planar or may have a recess into which the upper bent piece 14 can fit. Further, it is more preferred that the surface of the upper bent piece 14 fitted in the recess be flush with the side surface 6c.

The bottom bent piece 13 extends from a side plate 12b of the shell body 3 and is bent substantially at right angles to the side plate 12b. The free end portion of the bottom bent piece 13 is split in two, one of which is further bent substantially at right angles to the bottom bent piece 13 to form a riser portion 13a. The riser portion 13a fits into an engagement groove 6a formed in the stopper 6 (see FIG. 4) to prevent the stopper 6 from deforming sideways or projecting forwardly (coming off). The other split free end portion of the bottom bent piece 13 extends as is to form a stopper support portion 13b which engages a bottom surface 6b of the stopper 6 (see FIG. 4) to prevent the stopper 6 from deforming downward. The bottom surface 6b may simply be formed planar or may have a recess 6g into which the bottom bent piece 13 can fit. Further, it is more preferred that the surface of the bottom bent piece 13 fitted in the recess 6g be flush with the bottom surface 6b (see FIG. 4).

With the metal shell body 3 processed as described above, the stopper 6 of the molded base plate 2 is embraced (fixed and supported) and reinforced by the shell body 3 in three-dimensional directions—vertically, laterally and longitudinally—preventing deformations of the stopper 6 during the reflow soldering.

(Second Embodiment)

Figure 5:
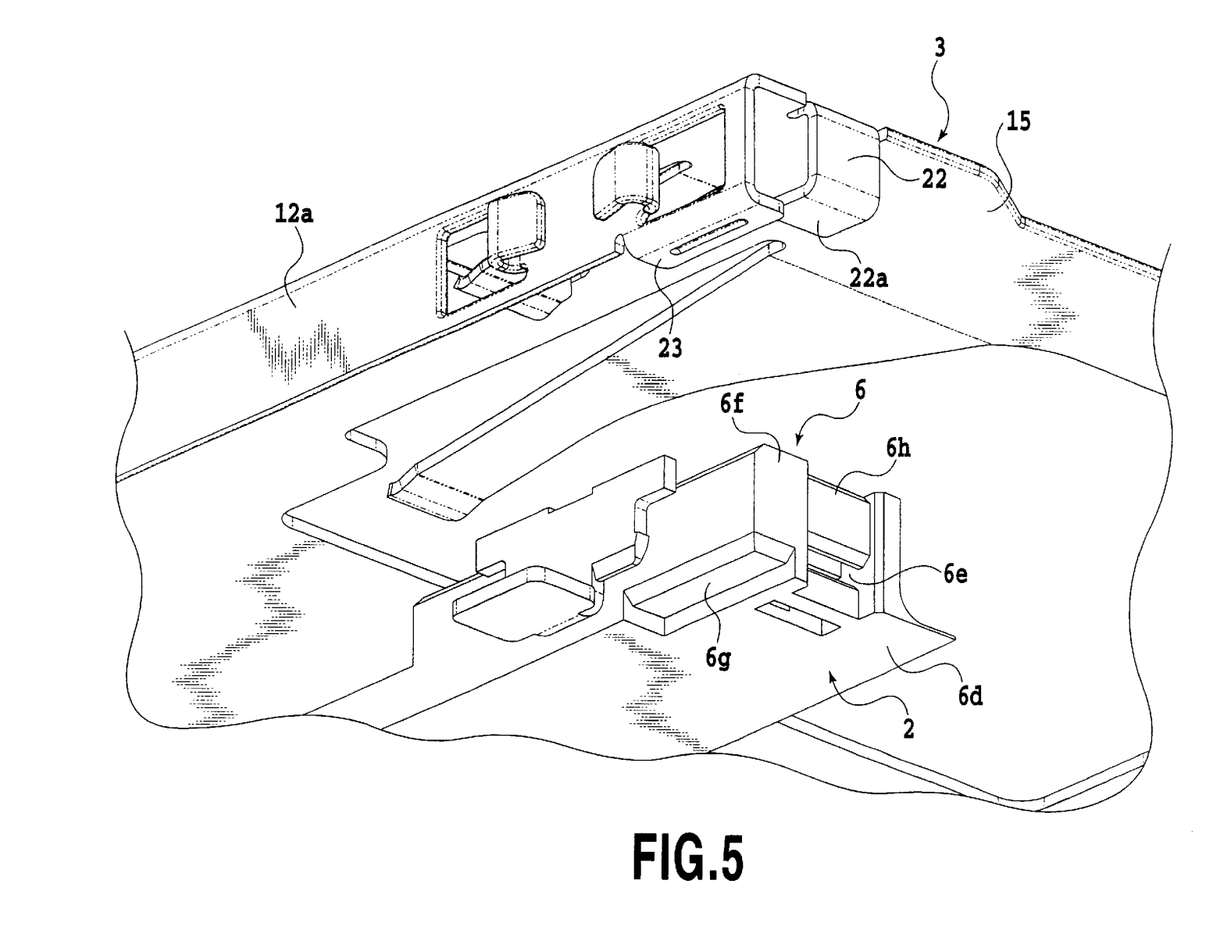
FIG. 5 is an essential-part enlarged view of a second embodiment of the card connector according to this invention, showing the molded base plate and the shell body before being assembled.

FIG. 5 shows an essential-part enlarged view of a second embodiment of the present invention. As shown in the figure, the card eject mechanism 40 is disclosed as being formed on the left side of the molded base plate 2.

In this embodiment, the shell body 3 has formed at its front left side a front bent piece 22 and a bottom bent piece 23 to embrace the stopper 6 of the molded base plate 2.

The front bent piece 22 narrower than the front surface of the stopper 6 extends from the top plate 15 of the shell body 3 and is bent substantially at right angles to the top plate 15. A free end portion 22a of the front bent piece 22 is bent substantially at right angles to the front bent piece 22. The front bent piece 22 engages a front surface 6f of the stopper 6 to prevent the stopper 6 from deforming sideways and projecting forwardly. The free end portion 22a fits into an engagement groove 6e formed in the stopper 6 to prevent the stopper 6 from deforming sideways and downward. The front surface 6f may simply be formed planar or may have a recess 6h into which the front bent piece 22 can fit. Further, it is more preferred that the surface of the front bent piece 22 fitted in the recess 6h be flush with the front surface 6f (see FIG. 4).

The bottom bent piece 23 extends from a side plate 12a of the shell body 3 and is bent substantially at right angles to the side plate 12a. The bottom bent piece 23 engages a bottom surface 6d of the stopper 6 to prevent downward deformation of the stopper 6. In this case too, the bottom surface 6d may simply be formed planar or may have a recess 6g into which the bottom bent piece 23 can fit. Further, it is more preferred that the surface of the bottom bent piece 23 fitted in the recess 6g be flush with the bottom surface 6d.

With the metal shell body 3 processed as described above, the stopper 6 of the molded base plate 2 in this embodiment, too, is embraced (fixed and supported) and reinforced by the shell body 3 in three-dimensional directions preventing deformations of the stopper 6 during the reflow soldering.

In the card connector of this invention, since the stopper of the resin molded base plate pressed by the compression coil spring is fixed and supported in three-dimensional directions by the metal shell body, the stopper can be prevented from being deformed even when high-temperature processing such as reflow soldering is performed to electrically connect the card connector to an electronic device by solder. Therefore, the card connector of this invention can further be reduced in size, height and weight.

The stopper fixing/supporting mechanism of this invention can be constructed easily.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A card connector comprising a metal shell body and a base plate molded out of resin, wherein the molded base plate includes at least a card eject mechanism adapted to insert and eject a card, a compression coil spring positioned to push the card eject mechanism, and a stopper positioned to hold the card eject mechanism against the push by the compression coil spring, and the metal shell body includes at least one bent piece positioned to embrace the stopper in three directions.

2. A card connector as claimed in claim 1, wherein the card eject mechanism further includes an eject member having a card engagement portion and being able to be moved against a force of the compression coil spring, a heart cam for restricting a movement and stopping of the eject member, and a cam lever to slide along the heart cam to restrict the movement and stopping of the eject member.

3. A card connector as claimed in claim 2, wherein the heart cam is formed on the molded base plate.

4. A card connector as claimed in claim 2, wherein the heart cam is formed on the eject member.

5. A card connector as claimed in claim 1, wherein the at least one bent piece is bent substantially at right angles to a side plate of the shell body to engage a bottom surface of the stopper, and at least a part of a free end portion of the bent piece is bent substantially at right angles to the bent piece and fitted into a groove formed in the stopper.

6. A card connector as claimed in claim 5, wherein that portion of the at least one bent piece which engages the bottom surface of the stopper is fitted in a recess formed in the stopper bottom surface so that the surface of the bent piece is flush with the stopper bottom surface.

7. A card connector as claimed in claim 5, wherein another bent piece is cut and erected from a top plate of the shell body and engages a side surface of the stopper.

8. A card connector as claimed in claim 1, wherein
the at least one bent piece has a width smaller than that of the stopper and is bent substantially at right angles to the top plate of the shell body to engage a front surface of the stopper, and at least a part of a free end portion of the bent piece is bent substantially at right angles to the bent piece and fitted into a groove formed in the stopper.

9. A card connector as claimed in claim 8, wherein that portion of the at least one bent piece which engages the front surface of the stopper is fitted in a recess formed in the stopper front surface so that the surface of the bent piece is flush with the stopper front surface.

10. A card connector as claimed in claim 8, wherein another bent piece is bent substantially at right angles to a side plate of the shell body and engages a bottom surface of the stopper.

11. A card connector comprising a shell body and a base plate molded out of resin, wherein the molded base plate includes:
- at least a card eject mechanism adapted to insert and eject a card, wherein the card eject member includes:
  - a compression coil spring;
  - an eject member having a card engagement portion and being able to be moved against a force of the compression coil spring;
  - a heart cam for restricting a movement and stopping of the eject member, wherein the heart cam is formed on the molded base plate; and
  - a cam lever to slide along the heart cam to restrict the movement and stopping of the eject member; and
- a stopper for holding the card eject mechanism pushed by the compression coil spring; and
- wherein the shell body includes at least one bent piece for fixing and supporting the stopper in three-dimensional directions.

12. A card connector as claimed in claim 11, wherein the heart cam is formed on the eject member.

13. A card connector as claimed in claim 11, wherein the at least one bent piece is bent substantially at right angles to a side plate of the shell body to engage a bottom surface of the stopper, and at least a part of a free end portion of the bent piece is bent substantially at right angles to the bent piece and fitted into a groove formed in the stopper.

14. A card connector as claimed in claim 13, wherein that portion of the at least one bent piece which engages the bottom surface of the stopper is fitted in a recess formed in the stopper bottom surface so that the surface of the bent piece is flush with the stopper bottom surface.

15. A card connector as claimed in claim 13, wherein another bent piece is cut and erected from a top plate of the shell body and engages a side surface of the stopper.

16. A card connector as claimed in claim 11, wherein the at least one bent piece has a width smaller than that of the stopper and is bent substantially at right angles to the top plate of the shell body to engage a front surface of the stopper, and at least a part of a free end portion of the bent piece is bent substantially at right angles to the bent piece and fitted into a groove formed in the stopper.

17. A card connector as claimed in claim 16, wherein that portion of the at least one bent piece which engages the front surface of the stopper is fitted in a recess formed in the stopper front surface so that the surface of the bent piece is flush with the stopper front surface.

18. A card connector as claimed in claim 16, wherein another bent piece is bent substantially at right angles to a side plate of the shell body and engages a bottom surface of the stopper.

* * * * *